United States Patent

[11] 3,554,341

[72] Inventor Norman J. Anderson
 Erie, Pa.
[21] Appl. No. 788,475
[22] Filed Jan. 2, 1969
[45] Patented Jan. 12, 1971
[73] Assignee Zurn Industries, Inc.
 Erie, Pa.
 a corporation of Pennsylvania

[54] COMBINATION CLUTCH AND COUPLING
 13 Claims, 1 Drawing Fig.
[52] U.S. Cl. .................................................. 192/70.2,
  192/70.12, 192/85, 192/105
[51] Int. Cl. .................................................. F16d 25/062,
  F16d 23/10
[50] Field of Search .......................................... 192/70.11,
  .12, 70.16, 70.19, 70.2, 85(A), 85(AL), 85(F),
  105(A)

[56] References Cited
UNITED STATES PATENTS
1,935,581 11/1933 Snow, Jr. ..................... 192/70.12
2,766,864 10/1956 Schilling et al. .............. 192/85(A2)
3,081,854 3/1963 Snyder .......................... 192/70.28
3,251,442 5/1966 Aschauer ..................... 192/85(A2)(X)

Primary Examiner—Allan D. Herrmann
Attorney—Charles L. Lovercheck

ABSTRACT: A clutch-coupling combination made up of a drive member and a driven member connected together by an inner drum, an outer sleeve and friction disc arrangement. The inner drum is connected to the driven member by a crowned tooth coupling. The inner drum has an inner cylindrical bearing surface which is piloted on and rotates on a bearing surface on the driving member. The main feature of the invention is that structure is provided whereby the friction clutch friction disc systems are always aligned, insuring uniform loading, while the shafts may be misaligned at some angle and offset from each other.

PATENTED JAN 12 1971
3,554,341
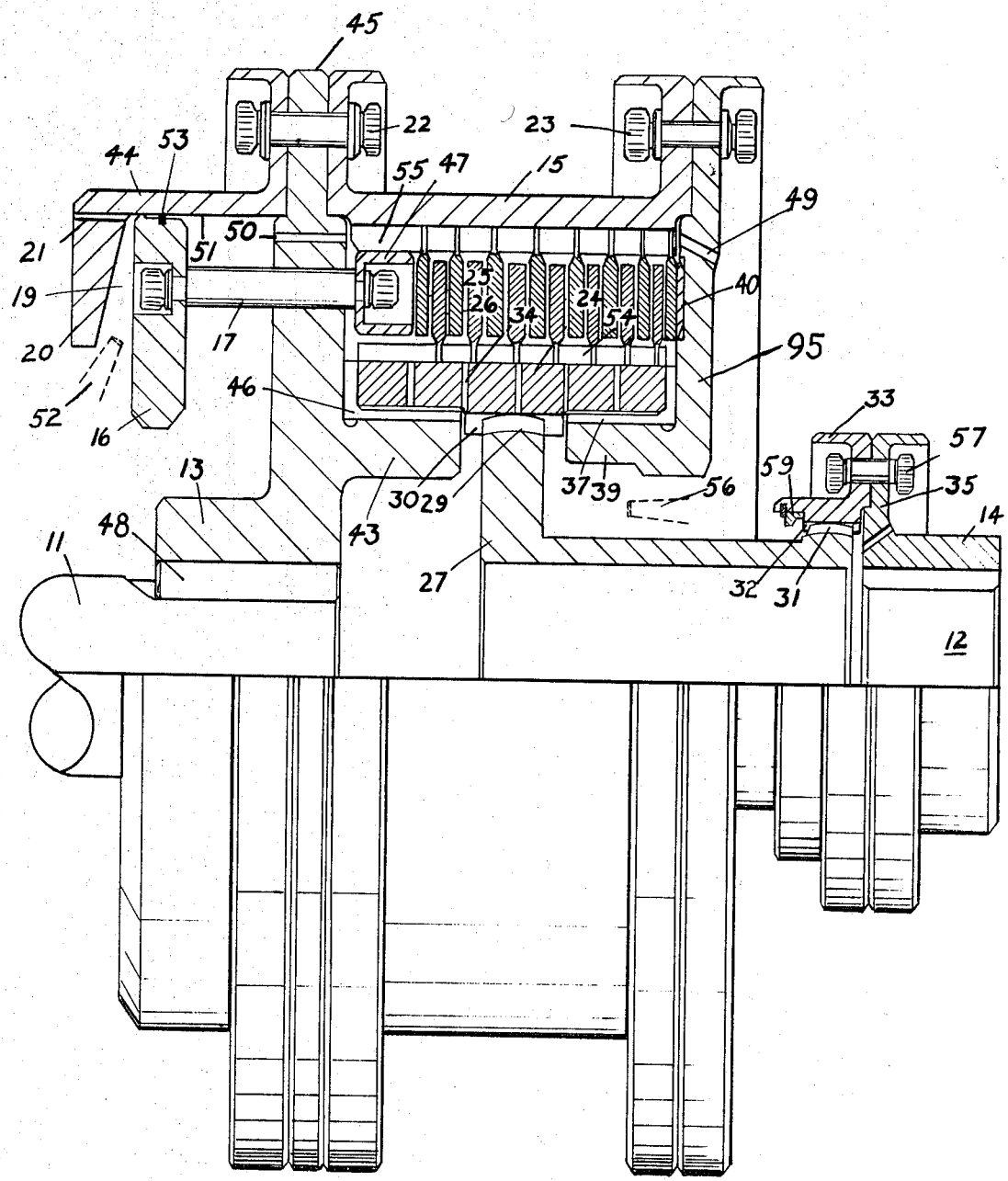
INVENTOR.
NORMAN J. ANDERSON
BY Charles L. Lovercheck
attorney

COMBINATION CLUTCH AND COUPLING

STATEMENT OF INVENTION

This invention relates to couplings and, more particularly, to a combination friction clutch and flexible coupling.

OBJECTS OF THE INVENTION

It is an object of the invention to provide an improved combination clutch and coupling wherein friction clutch discs are uniformly loaded.

Another object of the invention is to provide an improved clutch-coupling combination.

In the drawings:

The drawing shows a partial longitudinal, cross-sectional view of a coupling according to the invention.

Now with more particular reference to the drawing, the clutch combination shown is intended to connect the drive shaft 11 to the driven shaft 12 in such a manner that the two may operate in misaligned relation with each other.

The drive hub 13 is connected to the drive shaft 11 and the driven hub 14 is connected to the driven shaft 12. The two are connected by means of the coupling spacer 27 which has crowned teeth 29 and 31 on it. These crowned teeth 29 engage the internal splined teeth 30 on the inner drum 24 and crowned teeth 31 engage teeth 32 on the driven sleeve 33. The inner drum 24 can be connected to the drive hub 13 by means of the friction discs 25 and 26 actuated by the piston 16 which is connected through piston rod 17 to the pressure plate 47.

The drive shaft 11 is fixed to rotate with the hub 13 by key 48. The drive hub has the cylindrical, axially extending bearing support 43 which has external cylindrical and radial bearing surfaces 46 on its outer periphery which engages the internal cylindrical bearing surface on the inner drum 24. The inner drum 24 has the radially extending orifices 34 in it through which oil from the inside of the coupling may pass outward by centrifugal force and outward in turn through the orifices 49 and 50. The drive hub has an integral radially extending flange 45 which is attached to the clutch sleeve 15 and the outwardly directed flange on the cylinder 44 by means of bolts 22. The cylinder 44 extends circumferentially and then axially generally concentric to the shaft 11 and has the inwardly directed cylinder head 20 integrally attached to it. The cylinder head 20 and cylinder 44 and radially directed flange 45 form an annular chamber. Inside this annular chamber, the annular piston 16 may slide on the internal cylindrical surface 51 of the cylinder 44. Oil from nozzles 52 injected into the space between the cylinder head 20 and the piston 16 exerts a force on the piston due to centrifugal force on the oil and this force will force the piston and piston rod 17 and pressure plate 47 toward the clutch friction discs to urge the friction discs 25 and 26 into engagement with each other so that inner drum 24 will be urged to rotate with drive hub 13. A suitable piston ring 53 may be provided in a peripheral groove in piston 16.

The clutch sleeve 15 is rigidly fixed to the radially extending flange 45 by bolts 22 and fixed to the end plate 95 by bolts 23. The end plate 95 has a bearing member 39 on it which has external cylindrical and radial bearing surfaces 37, which are concentric with bearing surfaces 46. The bearing surfaces 37 and 46 support the inner drum 24 for rotation thereon. The teeth 30 are disposed in the annular space between the ends of the bearing support 43 and the end of the bearing support 39.

The inner drum 24 has axially extending circumferentially spaced splines 54 which engage inner circumferentially spaced notches on the inner discs 26 and restrain the discs 26 to rotate with the inner drum 24.

The outer discs 25 have notches on them that engage axially extending circumferentially spaced splines 55 on the inner peripheral surface of the clutch sleeve 15. A thrust bearing member 40 is fixed to the end plate 95 and this forms a pressure equalizer for the friction discs.

The clutch may be lubricated by oil from nozzle 56 and this oil may flow by centrifugal force through the orifices 34, 49 and 50.

The coupling spacer 27 has the external crowned teeth 29 and 31 on it as aforesaid. These teeth may have their tips and flanks crowned in spherical shape in a manner that is familiar to those skilled in the art of flexible gear couplings. The teeth 31 engage internal teeth on the inner periphery of sleeve 33. Sleeve 33 is bolted to flange 35 by bolts 57. The misalignment capacity of the coupling disc to crowned teeth is particularly disclosed in U.S. Pat. No. 2,682,760 issued to Robert H. Shenk.

It will be noted that the friction discs 26 will always be held in perfect alignment by the two bearing surfaces 46 and 37 and that oil when admitted to cavity 19 from the nozzle 52 will exert a force on the end of annular piston 16 to cause the piston to force the pressure plate 47 into engagement with the friction discs when the drive shaft is rotated at suitable speed. Obviously any other suitable actuating member could be substituted for this.

I claim:

1. A clutch-coupling combination comprising:
    a drive hub, a driven hub and an inner drum;
    axially spaced cylindrical surfaces on said drive hub assembly;
    said inner drum having spaced inner cylindrical surfaces received on said cylindrical surfaces on said drive hub assembly;
    inner peripheral teeth on said inner drum, said inner peripheral teeth being engaged by external peripheral teeth means connected to said driven hub;
    clutch discs comprising first and second clutch discs;
    a clutch sleeve fixed to said drive hub;
    means connecting said first clutch discs to said clutch sleeve;
    said second clutch discs adapted to engage said first clutch discs;
    means connecting said second clutch discs to the outer periphery of said inner drum; and
    means to force said clutch discs into engagement with each other.

2. The clutch-coupling recited in claim 1 wherein said means connecting said second clutch discs to said outer periphery of said inner drum comprises:
    circumferentially spaced axially extending splines on said outer periphery of said inner drum;
    circumferentially spaced notches on the inner periphery of said second clutch discs; and
    said splines being received in said notches in said second clutch discs.

3. The clutch-coupling combination recited in claim 1 wherein said means connecting said first clutch discs to said drive hub comprises axially extending circumferentially spaced splines on an inner peripheral surface on said clutch sleeve, circumferentially spaced notches on the outer periphery of said first clutch discs, said notches receiving said splines.

4. The clutch-coupling combination recited in claim 1 wherein said means to force said first clutch discs and said second clutch discs together comprises an annular pressure plate adapted to engage one of said clutch discs, and an annular piston connected to said annular pressure plate and means to impress a force on said annular piston.

5. A clutch-coupling combination comprising:
    a drive hub member;
    a driven hub member;
    an inner drum member;
    means connecting said inner drum member to said driven hub member;
    a cylindrical bearing surface on said drive hub member;
    a cylindrical bearing surface on said inner drum member rotatably received on said drive hub member cylindrical surface;
    a clutch sleeve fixed to said drive hub;
    said clutch sleeve being generally concentric to said inner drum and defining an annular space between said clutch sleeve and said inner drum; drive clutch discs on said clutch sleeve in said annular space;

driven clutch discs on said inner drum in said space;

said drive clutch discs having engaging means adapted to engage said driven clutch discs;

means connecting said drive clutch discs to said drive hub;

and means connecting said driven clutch discs to said inner drum;

actuating means for forcing said drive clutch discs and said driven clutch discs into frictional engagement with each other whereby said drive hub and said inner drum are fixed together;

said means connecting said driven hub and said inner drum together comprise internal teeth on said inner drum;

a coupling spacer;

external gear teeth on said coupling spacer engaging said internal teeth on sad inner drum; and and means connecting said coupling spacer to said driven hub.

6. The combination recited in claim 5 wherein said drive hub has:

a radially outwardly extending flange fixed thereto;

an annular cylinder attached to the outer periphery of said radially extending flange;

an inwardly extending cylinder head fixed to said cylinder;

said cylinder head being generally concentric to said drive hub;

an internal cylindrical surface on said cylinder;

said actuating means comprising an annular piston having an external cylindrical surface slidably engaging said internal cylindrical surface on said cylinder; and piston rod means attached to said piston and engaging said friction discs.

7. The combination recited in claim 5 wherein said means connecting said coupling spacer to said driven hub comprises:

external teeth on said coupling spacer; and internal teeth in a member supported on said driven hub engaging said external teeth on said spacer drum.

8. The combination recited in claim 5 wherein said means connecting said innner drum to said driven hub comprises a coupling spacer having first external teeth and second external teeth thereon spaced from said first external teeth;

first internal teeth on said inner drum engaging said first external teeth;

second internal teeth on means on said driven hub engaging said second external teeth; and said first external teeth and said second external teeth having generally spherical flank surfaces.

9. The combination recited in claim 5 wherein said actuating means comprises:

an axially extending piston rod on said drive hub;

means on said piston rod engaging said clutch discs;

a cylinder on said drive hub;

said cylinder having an inwardly directed cylinder head;

an annular piston slidably engaging said cylinder;

said inwardly directed cylinder head;

said piston and said cylinder defining an annular control space; and means to admit liquid to said annular control space whereby centrifugal force acting on said piston moves said piston to actuate said discs.

10. The combination recited in claim 9 wherein said inwardly directed cylinder head has bleed holes therein adjacent the outer periphery thereof whereby liquid may escape from said annular space.

11. The combination recited in claim 5 wherein two said cylindrical bearing surfaces are supported on said drive hub;

said two said cylindrical bearing surfaces comprising first and said second bearing surfaces being axially spaced from each other;

said inner drum has two spaced external cylindrical bearing surfaces engaging said first and said second bearing surfaces; and said teeth on said inner drum being disposed between said first bearing surfaces and said second bearing surfaces.

12. The combination recited in claim 11 wherein said means connecting said coupling spacer to said driven hub comprises:

external teeth on said coupling spacer; and internal teeth on means on said driven hub engaging said external teeth.

13. The combination recited in claim 11 wherein:

said clutch sleeve is fixed to said radially extending flange;

said clutch sleeve extends axially from said radially extending flange and generally concentric to said cylindrical bearing surface;

an inwardly directed end plate on the end of said clutch sleeve;

and an axially extending bearing member on said inwardly directed end plate; and a second driven drum bearing surface being disposed on said axially extending bearing member.